(12) United States Patent
Kovach (10) Patent No.: US 10,383,272 B2
(45) Date of Patent: Aug. 20, 2019

(54) TILLAGE AND FERTILIZER KNIFE ATTACHMENT METHOD

(71) Applicant: CNH Industrial America LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 154 days.

(21) Appl. No.: 15/371,269

(22) Filed: Dec. 7, 2016

(65) Prior Publication Data

US 2018/0153087 A1 Jun. 7, 2018

(51) Int. Cl.
  *A01B 61/04* (2006.01)
  *A01B 3/24* (2006.01)
  *A01B 49/02* (2006.01)

(52) U.S. Cl.
  CPC .......... *A01B 61/042* (2013.01); *A01B 61/046* (2013.01); *A01B 49/027* (2013.01)

(58) Field of Classification Search
  CPC ....... A01B 61/042; A01B 61/044; A01B 3/24; A01B 49/027
  USPC .......................................................... 172/265
  See application file for complete search history.

(56) References Cited

U.S. PATENT DOCUMENTS 6,012,534 A * 1/2000 Kovach ................. A01B 13/08
                                                          172/156
2016/0106019 A1* 4/2016 Smola .................. A01B 61/046
                                                          172/260.5

* cited by examiner

*Primary Examiner* — Tara Mayo-Pinnock
(74) *Attorney, Agent, or Firm* — Rebecca L. Henkel; Rickard K. DeMille (57) ABSTRACT

A tillage implement includes at least one row unit having at least one shank assembly. The shank assembly includes a shank engaged at one end to the at least one row unit and at an opposing end to a tool. Planar members are positioned on a portion of each lateral side of the shank and the tool. The shank includes at least two mounting features and the tool includes one mounting feature. Each planar member has at least two matching mounting features for the shank and at least one matching mounting feature for the tool. A first connecting member engages at least one of the at least two matching mounting features, and a second connecting member also engages one of the at least two matching mounting features. One additional connecting member engages one mounting feature of the tool and one matching mounting feature of each planar member.

12 Claims, 8 Drawing Sheets

TILLAGE AND FERTILIZER KNIFE ATTACHMENT METHOD

FIELD OF THE INVENTION

The present invention relates to agricultural implements, and, more particularly, to shank and tool assemblies for agricultural field tillage implements.

BACKGROUND OF THE INVENTION

Farmers utilize a wide variety of tillage implements to prepare soil for planting. For example, a strip tillage implement is capable of tilling soil in strips along the intended planting rows, moving residue to the areas in between rows, and preparing the seedbed of the strip in preparation for planting. As another example, a field cultivator is also capable of simultaneously tilling soil and leveling the tilled soil in preparation for planting. A tillage implement, whether of the strip tillage variety or of the traditional field cultivator variety, has a frame that carries a number of cultivator shanks which can carry various tools at their lower ends for tilling the soil such as shovels, knives, points, sweeps, coulters, spikes, and plows. Each performs a function intended to ultimately convert compacted soil into a level seedbed with a consistent depth for providing desirable conditions for planting crops. Grass or residual crop material disposed on top of the soil is also displaced from the seedbed or worked into the seedbed so that it does not interfere with a seeding implement subsequently passing through the seedbed. Other devices attached to the tillage implement may perform functions such as inserting fertilizer following passage of the cultivator shanks, closing the furrow created by the cultivator shanks, or breaking up the clods to create the uniform seedbed.

It is well known in the art to provide tool assemblies for tilling the soil that are attached to shanks by way of a single side mounting between the tool assembly and the shank using ordinary fastener hardware. This allows easy replacement of the tool assembly as needed due to wear and breakage. Often, the shank is offset at one end, so that the tool assembly remains on the centerline of the tool and shank assembly. One or more of the fasteners connecting the working part of the tool assembly, such as the shovel, knife, point, sweep, coulter, spike, or plow, to the remainder of the tool assembly sometimes acts as a shear member, so that upon contact between the working part of the tool and a resistant object, such as a rock, the fastener shears, thereby minimizing breakage of the working part of the tool.

Because of the single side mounting between the tool assembly and the shank, the fasteners connecting the tool assembly to the shank are in single shear. Furthermore, as the tool assembly flexes under the load of being drawn through the soil, it may flex somewhat from side to side, as well as flexing backwards. This results in cleavage forces at the point where the fastener connects the tool assembly to the shank. As a result, these fasteners commonly fail during use. Worse, in the process of failing or yielding the tool assembly tends to depart from proper forward alignment, so that the tool assembly, or the working part of the tool particularly, breaks or is damaged due to side loads.

If the tool assembly remains attached to the shank and to the tillage implement, it may then be permanently deformed so that it operates out of alignment with the direction of travel of the tillage implement. Such alignment of the shank and tool assembly with the direction of travel of the tillage implement is critical to proper operation of the tillage implement. Continued use of a shank and tool assembly in a deformed state is detrimental to the performance of the tillage implement, not only because that particular shank and tool assembly does not perform its function correctly, but also because the deformed shank and tool assembly generates uneven drag or even acts as a rudder, pulling the remainder of the tillage slightly sideways. This reduces the performance of the other shank and tool assemblies, and other devices attached to the tillage implement, and further requires greater tractive effort on the part of the tractor to move the tillage implement through the soil.

What is needed in the art, therefore, is a way to more closely control the conditions under which a tool assembly shears away from a shank upon contact between the working part of the tool and a resistant object such as a rock. Further, a way is needed to prevent secondary damage to the tool assembly or detrimental performance of the tillage implement due to ongoing misalignment of a bent tool assembly or due to side loads during the process of shear separation from the shank.

SUMMARY OF THE INVENTION

Embodiments of the present invention are implemented on a tillage implement and provide such a way to minimize secondary damage to the tool assembly upon contact between the working part of the tool and a resistant object such as a rock. Embodiments of the present invention may incorporate a standardized or modular shank assembly as part of a row unit, having a straight sided flat shank having no offset. In at least one embodiment of the present invention, double adapter plates connect the tool to the shank, one on each side of both the shank and the tool. The adapter plates are attached to the shank and to the tool by way of mounting features, which may be bolts or pins through holes in the adapter plates and in the shank and tool. In at least one embodiment of the present invention, at least one of the bolts or pins may be designed as a shear member, so that the amount of resistance to shear along the planes between the adapter plates and the shank, perpendicular to the direction of motion of the tillage implement, is tightly controlled. Alternately, the mounting features in this arrangement may be cylindrical bosses on the shank and matching holes in the adapter plates, or vice versa, with at least one set of the bosses being designated as the shear member. In other embodiments of the present invention, none of the bolts or pins or other mounting features may be designated as a shear member, such that springs on the row unit assembly act to absorb shock and prevent damage to the tool assembly upon contact between the working part of the tool and a resistant object. In this case, or even in the case of row unit assemblies that incorporate no such springs to absorb shock, the double adapter plates and the bolts, pins, or other mounting features acting in double shear provide additional support and strength to the tool assembly, thereby preventing damage due to bending and misalignment.

By way of this symmetrical arrangement of the shank, double adapter plates, and tool assembly on a common centerline, and/or by way of configuring one of the sets of mounting features between the double adapter plates and the shank as a pivot, and/or configuring another of the sets of mounting features between the double adapter plates and the shank as a shear member, alignment of the tool assembly to the shank, and thereby to the travel direction of the tillage implement, is greatly improved. Under the stress of being pulled through potentially hard packed soil, whether or not one of the sets of mounting features between the double adapter plates and the shank is designated as a shear member, the shank and tool assembly remains aligned in the longitudinal direction, minimizing side loads and breakage of the working part of the tool assembly. In the case of contact of the tool assembly with a hard object and shear of the shear member at the planes of contact between the adapter plates and the shank, in an embodiment of the present invention that designates one of the bolts, pins, or other mounting features as a shear member, the tool assembly is prevented from twisting about its connections with the two adapter plates and/or about the remaining connection between the two adapter plates and the shank. This again minimizes any tendency of the tool assembly to bend as a result of being dragged sideways. In other words, upon shear of the shear member, the two adapter plates and the tool assembly simply pivots up and rearwards about the mounting feature configured as a pivot, typically the uppermost mounting feature, while remaining in the plane of the arc of the shank. Even in an embodiment of the present invention that does not designate one of the bolts, pins, or other mounting features as a shear member, the tool assembly is prevented upon contact with a hard object from twisting about its connections with the two adapter plates and/or about the connection between the two adapter plates and the shank.

In another embodiment of the present invention, the tool assembly includes a single adapter, which may be cast, formed, or a welded construct, as non-limiting examples. The single adapter has ears that extend forward to each side of the shank, taking the place of the adapter plates. The ears of the adapter are similarly attached to the shank by way of mounting features, which may be bolts or pins through holes in the ears of the adapter and in the shank. At least one of the bolts or pins may again be designated as a shear member, so the amount of resistance to shear along the planes between the ears of the adapter and the shank, perpendicular to the direction of motion of the tillage implement, is tightly controlled.

By way of the symmetrical arrangement of the shank, the single adapter, the ears of the single adapter, and/or by way of configuring one of the sets of mounting features between the ears of the single adapter and the shank as a pivot, and/or configuring another of the sets of mounting features between the ears of the single adapter and the shank as a shear member, alignment of the tool assembly to the shank, and thereby to the travel direction of the tillage implement, is greatly improved. Again, this alignment is thereby maintained under the stress of being pulled through hard packed soil, and/or upon shear of the shear member at the planes of contact between the ears of the single adapter, in such embodiment of the present invention wherein a set of mounting features is so designated as a shear member. In this case, the adapter and tool assembly pivots up and rearwards about the mounting feature configured as a pivot, and does so without twisting about its remaining connection between the ears of the single adapter and the shank.

The mounting features of the shank may be common with the mounting features of several tools arranged as embodiments of the present invention, in modular fashion. In each case, the relative thicknesses and cross sections of the components of the shank, the adapter plates, and/or the components of the tool assembly, as well as the relative strengths of the shear, pivot, and other fasteners, may be arranged so that the shear member, such as a shear bolt, would shear first upon contact of the tool assembly with an unyielding object. Thereafter, should there be a failure of the shear member to shear properly, the tool or other subcomponent of the assembly would yield before the shank itself, thereby minimizing damage to more expensive parts of the tillage implement. In this way, tool assemblies of multiple configurations may be easily adapted to connect to the shank, while preserving certain strength and alignment characteristics, and minimizing secondary damage to the tool assembly upon contact between the tool assembly and an unyielding object.

In an embodiment of the present invention that utilizes a shear member, which may be a shear bolt, the shear member may be provided with one or more features to ensure that the shear member shears upon contact between the tool assembly and an unyielding object before significant damage is done to the tool assembly or to the shank assembly. The shear ensuring feature or features of the shear member may be as simple as a reduced diameter in comparison to the pivot bolt or other mounting fasteners. Alternately, the shear member may be provided with other shear ensuring features that promote shear in a controlled manner, such as a frangible score line or neck, or certain metallurgical properties.

In accordance with one aspect of the present invention, there is provided a tillage implement. The tillage implement has at least one row unit with at least one shank assembly including a shank. A tool assembly is connected to each of the shank assemblies by way of a planar member on each lateral side of the shank. The shank has at least two mounting features, and each planar member has at least two matching mounting features. A first connecting member is engaged with one of the mounting features of the shank and with one of the matching mounting features of each planar member. At least one additional connecting member is engaged with at least one of the mounting features of the shank and with at least one of the matching mounting features of each planar member.

In accordance with another aspect of the present invention, there is provided a ground working member of a tillage implement. The ground working member includes a shank assembly with a shank. A tool assembly is connected to the shank assembly by way of a planar member on each lateral side of the shank. The shank has at least two mounting features. Each planar member has at least two matching mounting features. A first connecting member is engaged with one of the mounting features of the shank and with one of the matching mounting features of each planar member. At least one additional connecting member is engaged with at least one of the mounting features of the shank and with at least one of the matching mounting features of each planar member.

In accordance with yet another aspect of the present invention, there is provided a method of manufacturing a tillage implement. The method includes several steps. The first step is attaching at least one row unit to the tillage implement. The second step is pivotally engaging at least one shank assembly including a shank with the at least one row unit and biasing the at least one shank assembly toward engagement with the ground using at least one spring member. The third step is connecting a tool assembly to each of the shank assemblies on a common vertical centerline by way of a symmetrically opposite planar member on each lateral side of the shank. The least one shank assembly and the tool assembly are arranged on a common vertical centerline when the tool assembly is connected to the shank by way of the symmetrically opposite planar members. The fourth step is providing the shank with at least two mounting features. The fifth step is providing each planar member with at least two matching mounting features. The sixth step is engaging a pivot member with one of the mounting features of the shank and with one of the matching mounting features of each planar member. The seventh step is engaging at least one shear member with at least one of the mounting features of the shank and with at least one of the matching mounting features of each planar member.

An advantage of the shank and tool assembly described herein is that the double adapter plate mounting of the tool assembly to the shank assembly greatly improves the alignment of the tool assembly to the tillage implement, thereby providing more precise control of the tool assembly. The mounting features between the tool assembly and the double adapter plates, and the mounting features between the double adapter plates and the shank, including those in an embodiment of the present invention having mounting features designed to provide a pivot upon contact between the tool assembly and a hard object, and having mounting features designed to shear upon such contact, have two parallel shear planes. This provides additional support to the tool assembly in order to reduce breakage under normal operating conditions and under conditions where contact between the tool assembly and a hard object has occurred. Failure upon contact between the tool assembly and a hard object is limited to the shear member, if included in the embodiment of the present invention, and minimizes damage to other parts of the tool assembly. Because of the symmetric design, both upon such shear event and in normal usage, the point of the tool remains longitudinally aligned with the movement of the tillage implement, thereby avoiding side loading of the tool assembly. When the shear member, if included in the embodiment of the present invention, shears upon contact between the tool assembly and a hard object, the tool assembly then simply pivots up and behind the shank.

The shank and tool assembly is modular, so that the mounting features used are interchangeable with many types of tools, such as fertilizer knives, front mounted chisels, and strip till knives. The design is compatible with and can use a V shaped shin deflector mounted ahead of the tool, in order to shed soil and crop residue.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "forward", "rearward", "left" and "right", are used principally throughout this specification for convenience but it is to be understood that these terms are not intended to be limiting. When used in connection with the tillage implement, row unit, shank assembly, and/or components thereof, these terms are usually determined with reference to the direction of forward operative travel of the tillage implement, but again, they should not be construed as limiting. The terms "longitudinal" and "transverse" are determined with reference to the fore-and-aft direction of the tillage implement and are equally not to be construed as limiting.

Figure 1:
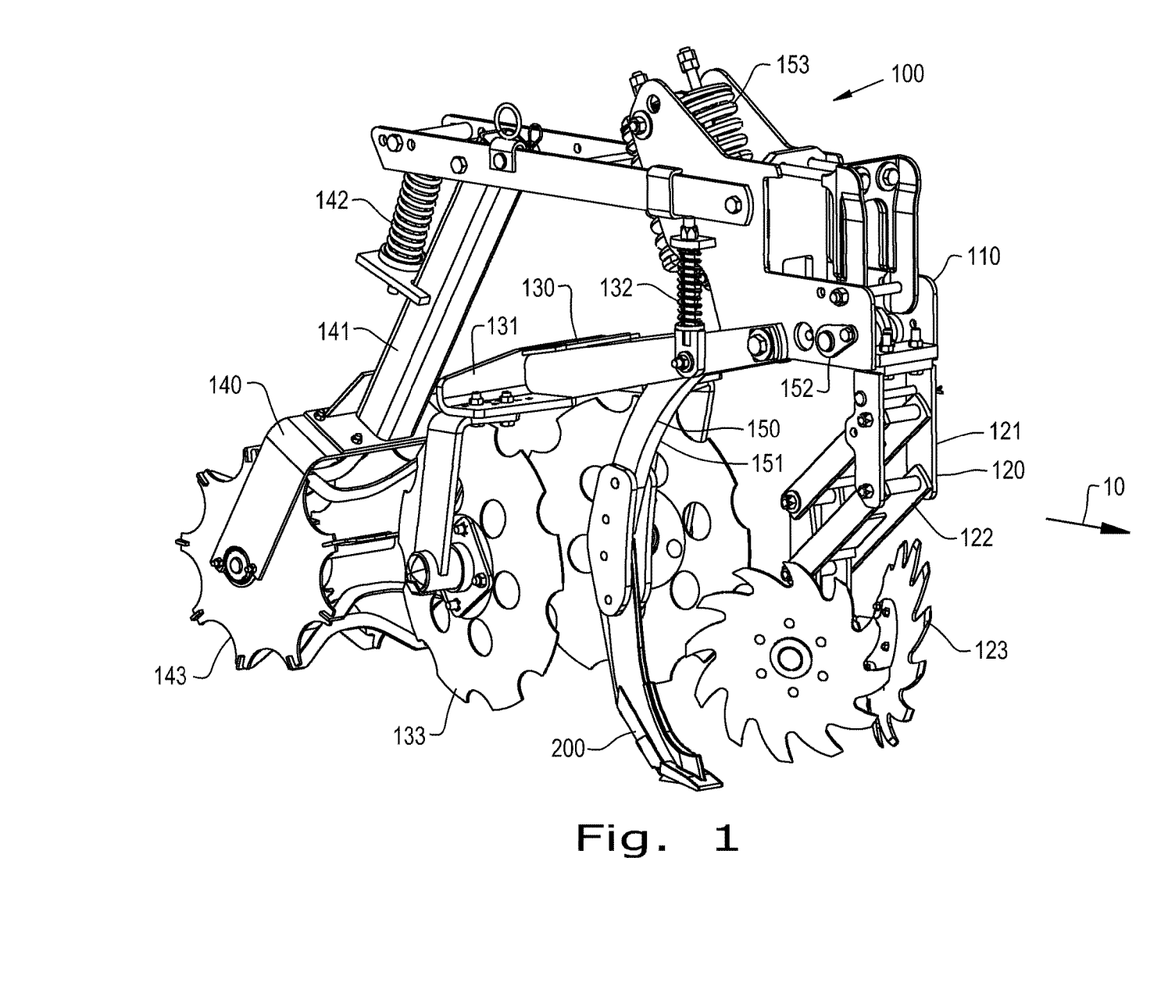
FIG. 1 is a front isometric view of a row unit, in accordance with an exemplary embodiment of the present invention.

Referring now to the drawings, and more particularly to FIG. 1, there is shown a row unit 100 according to an embodiment of the present invention. The row unit 100 performs several functions as it moves in the travel direction 10, including displacing grass or residual crop material using the row cleaner assembly 120, breaking up, aerating, and/or fertilizing the soil using the shank assembly 150, closing the furrow and creating a berm using the sealing disc assembly 130, and breaking up clods and preparing the seedbed using the rolling basket assembly 140. The row unit 100 includes a row unit mount assembly 110 which clamps to the toolbar of a tillage implement (not shown), and which provides a point of attachment for each of the row cleaner assembly 120, the shank assembly 150, the sealing disc assembly 130, and the rolling basket assembly 140.

The row cleaner assembly 120 includes a row cleaner assembly mount 121, which may be pivotally connected to the row unit mount assembly 110. A row cleaner suspension 122 is connected to the row cleaner assembly mount 121. Two row cleaner wheels 123 are connected to the row cleaner suspension 122 at oblique angles, such that, as the row unit 100 moves in the travel direction 10, grass or residual crop material is moved to either side of the following shank assembly 150. The pivotal connection between the row cleaner assembly mount 121 and the row unit mount assembly 110 allows the two row cleaner wheels 123 to remain approximately centered before the following shank assembly 150 as the tillage implement turns. The row cleaner suspension 122 keeps the two row cleaner wheels 123 properly engaged with the ground as the depth of the following shank assembly 150 is varied, and as the tillage implement passes over ground irregularities.

The shank assembly 150 includes a shank 151 connected to the row unit mount assembly 110, and a tool assembly 200. In at least one embodiment of the present invention, the shank 151 may be connected to the row unit mount assembly 110 by way of shank pivot 152 and shank springs 153. In this way, resilient support is provided for the tool assembly 200 as the row unit 100 moves in travel direction 10 and the tool assembly 200 performs its function of breaking up, aerating, and/or fertilizing the soil. Upon contact between the tool assembly 200 and an excessively resistant item, such as a rock, the shank pivot 152 and shank springs 153 allow the shank 151 and tool assembly 200 to pivot back and upward to avoid breakage of the shank 151 or tool assembly 200. In other embodiments of the present invention, the shank 151 may be fixedly connected to the row unit mount assembly 110, so breakage of the shank 151 or tool assembly 200 is avoided by use of a shear member, and/or by substantial support of the tool assembly 200 against impact loads, as will be illustrated.

The sealing disc assembly 130 includes a sealing disc assembly frame 131, which is also pivotally connected to the row unit mount assembly 110. Sealing disc assembly springs 132 keep two sealing discs 133 properly engaged with the ground as the depth of the shank assembly 150 is varied, and as the tillage implement passes over ground irregularities. In this way, as the row unit 100 moves in the travel direction 10, the two sealing discs 133 perform their function of closing the furrow and creating a berm.

The rolling basket assembly 140 similarly includes a rolling basket assembly arm 141 pivotally connected to the row unit mount assembly 110. A rolling basket assembly spring 142 keeps the rolling basket 143 properly engaged with the ground as the depth of the shank assembly 150 is varied, and as the tillage implement passes over ground irregularities. In this way, as the row unit 100 moves in the travel direction 10, the rolling basket 143 performs its function of breaking up clods and preparing the seedbed.

Figure 2A:
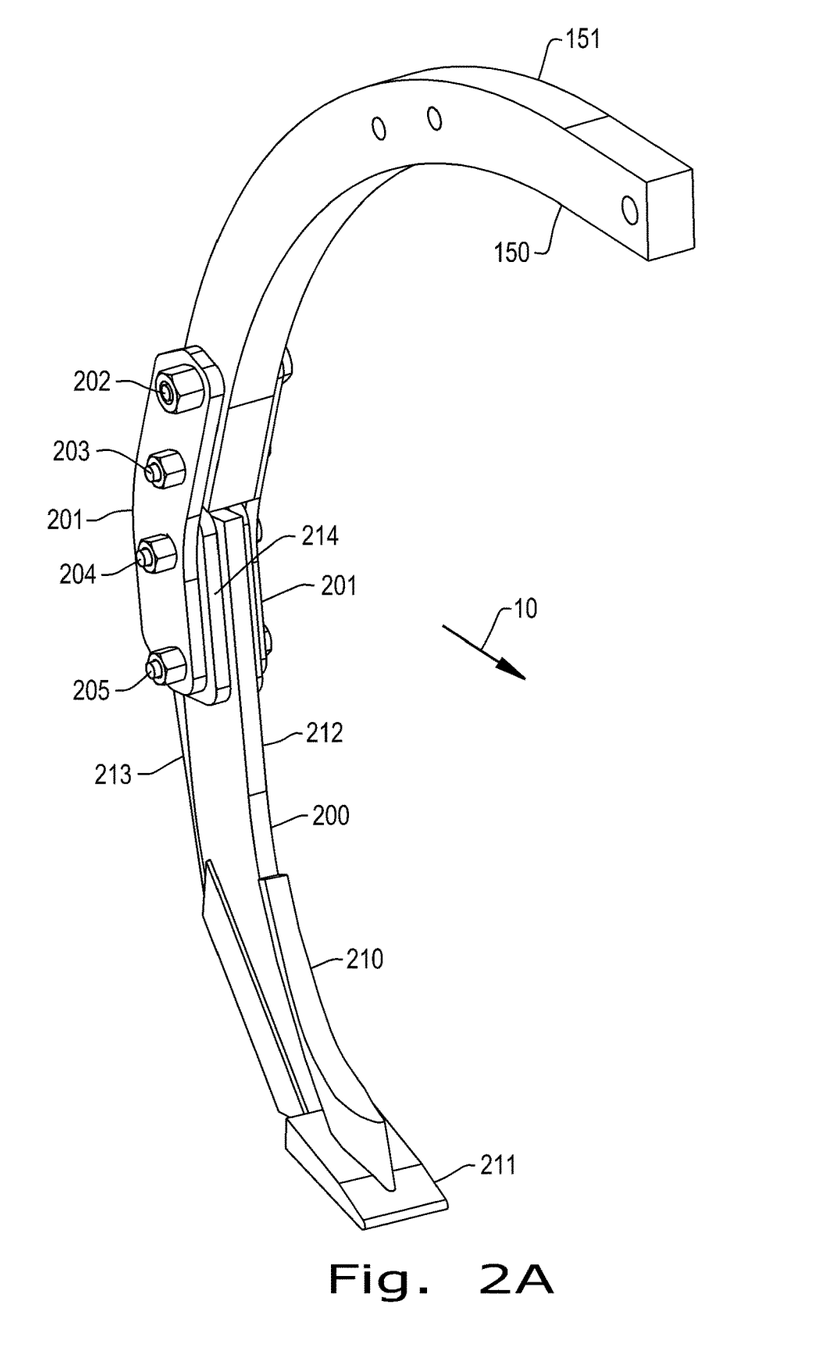
FIG. 2A is an isometric view of a shank and fertilizer knife assembly, in accordance with an exemplary embodiment of the present invention.
Figure 2B:
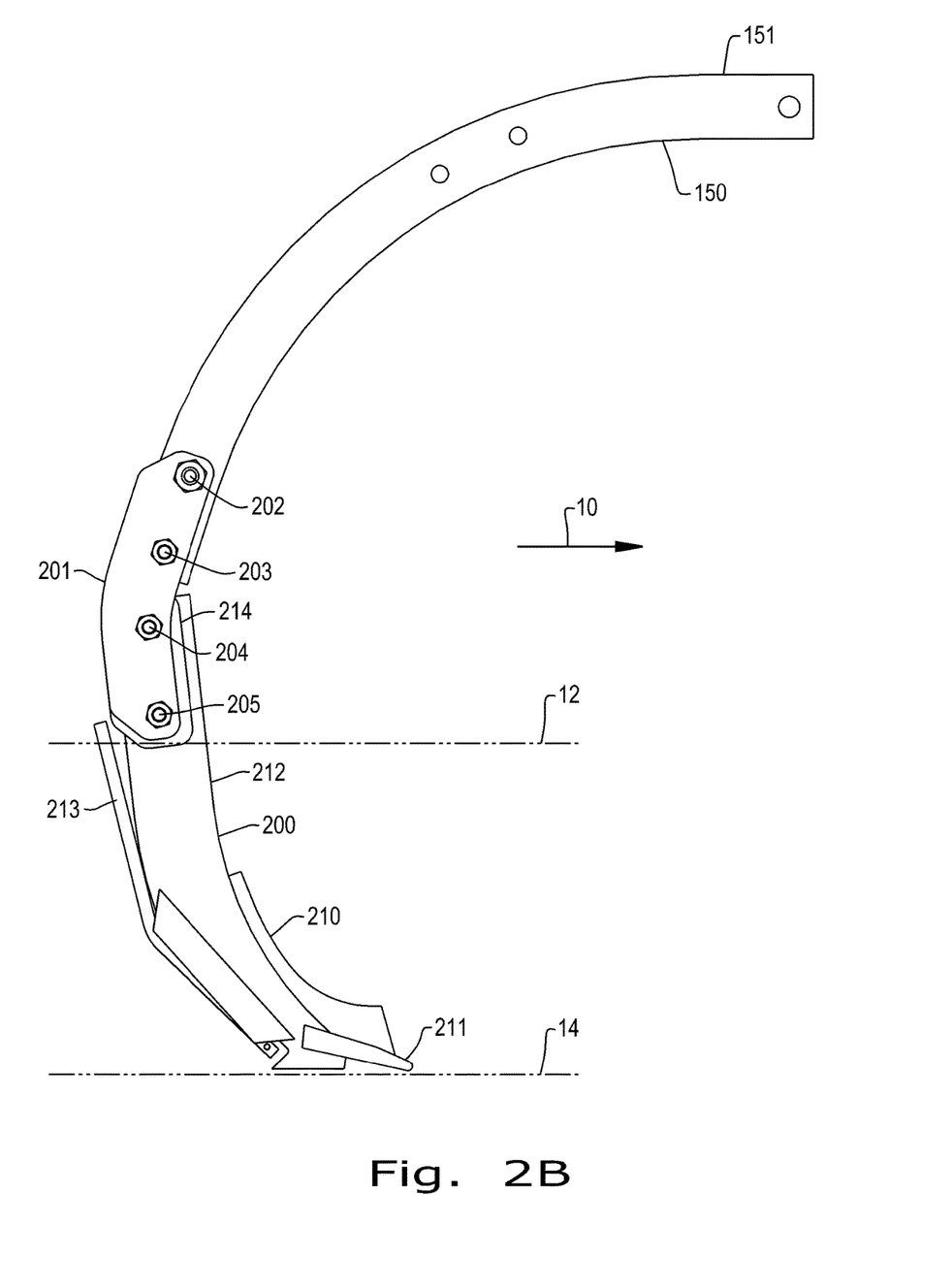
FIG. 2B is a side view of a shank and fertilizer knife assembly, in accordance with an exemplary embodiment of the present invention.
Figure 2C:
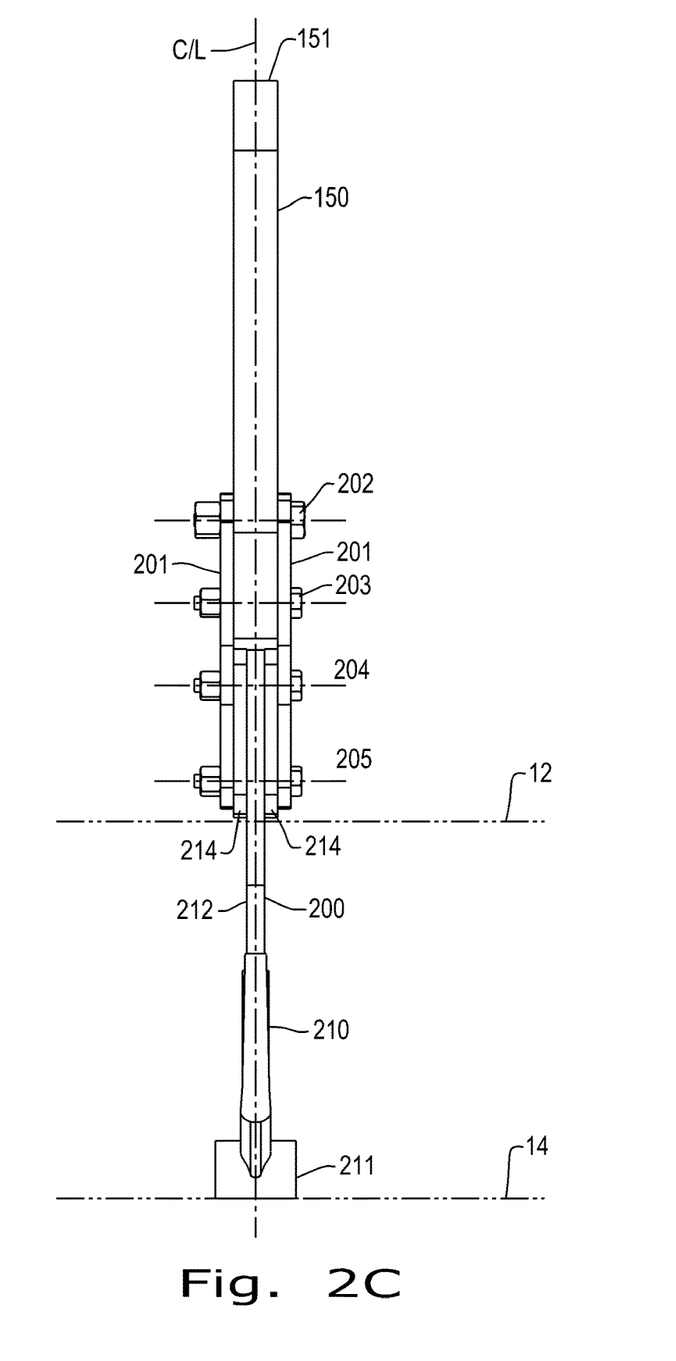
FIG. 2C is a front view of a shank and fertilizer knife assembly, in accordance with an exemplary embodiment of the present invention.

Turning now to FIGS. 2A, 2B, and 2C, there is shown an embodiment of the present invention, a shank assembly 150 including a shank 151 and a tool assembly 200. The shank 151 is part of a modular system, such that tool assemblies of multiple configurations are easily adapted to connect to the shank 151 while preserving certain strength and alignment characteristics, as will be shown. In the embodiment of the present invention shown in FIGS. 2A, 2B, and 2C, the shank 151 describes part of an arc, extending from an approximately horizontal alignment where it connects to the shank pivot 152 of the row unit mount assembly 110 (not shown) in the travel direction 10, to approximately 20° from vertical in the downward direction. At its downward end, the shank 151 is provided with at least two mounting features, which may be holes. Two adapter plates 201 are attached to the shank 151 by way of matching mounting features, which may be holes, through which an adapter plate pivot bolt 202 and an adapter plate shear bolt 203 may be inserted as shown. The adapter plate pivot bolt 202 and adapter plate shear bolt 203 may be in the form of bolts, as shown, or may be in the form of pins, as a non-limiting example. Alternately, the mounting features of the shank 151 may be projecting cylindrical bosses, over which the holes in the two adapter plates are fitted, and with a cotter pin or similar device retained.

The tool assembly 200 is attached to the two adapter plates 201 by way of at least two further mounting features, which may again be holes and which match holes in the two adapter plates 201. An upper tool mounting bolt 204 and a lower tool mounting bolt 205 may inserted through the matching holes in the tool assembly 200 and in the two adapter plates 201. The upper tool mounting bolt 204 and lower tool mounting bolt 205 may again be in the form of bolts, as shown, or may be in the form of pins, as a non-limiting example. Further, the matching mounting features of the tool assembly 200 may alternately be projecting cylindrical bosses, over which projecting cylindrical bosses the holes in the two adapter plates 201 are fitted, and with a cotter pin or similar device retained.

The tool assembly 200, which in FIGS. 2A, 2B, and 2C is a fertilizer knife assembly 210, has a fertilizer knife blank 212 including the matching mounting features to which the two adapter plates 201 are attached by way of the upper tool mounting bolt 204 and lower tool mounting bolt 205. The fertilizer knife blank 212 extends downwards from its attachment to the two adapter plates 201, approximately at the surface line 12, to a lower terminus having a fertilizer knife point 211, approximately at depth line 14. The fertilizer knife assembly 210 may be provided with a fertilizer tube 213, through which fertilizer is delivered to the area of the depth line 14 following passage of the fertilizer knife point 211.

Considering particularly FIG. 2C, it can be seen that the shank assembly 150 and the tool assembly 200 share a common centerline C/L from the uppermost end of the shank 151 to the fertilizer knife point 211, unlike prior art side mounted fertilizer knives. Depending on the configuration of the tool assembly 200, spacers 214 may be required between the adapter plates 201 and the tool assembly 200. These spacers 214 may be welded to the fertilizer knife blank 212, or integrated therewith, or may be simply stacked next to the fertilizer knife blank 212. By arranging the shank 151 and the tool assembly 200 to have a common centerline from the uppermost end of the shank 151 to the fertilizer knife point 211, and by configuring the adapter plates 201 to be symmetric to one another, alignment of the tool assembly 200 to the shank 151, and thereby to the travel direction 10 of the tillage implement, is greatly improved. Furthermore, by arranging the shank 151 and the tool assembly 200 to have a common centerline from the uppermost end of the shank 151 to the fertilizer knife point 211, and by configuring the adapter plates 201 to be symmetric to one another, alignment of the tool assembly 200 to the shank 151 when under the stress of being pulled through potentially hard packed soil, is improved.

The relative thicknesses and cross sections of the fertilizer knife blank 212, the two adapter plates 201, and of the shank 151, along with the matching mounting features of the fertilizer knife blank 212, the two adapter plates 201, and of the shank 151, may be chosen in such a way that, upon contact of the tool assembly 200 with a hard object and failure of the shank assembly 150 to pivot up and over the hard object, the most likely outcome is shear of the second uppermost matching mounting feature, which in this embodiment of the present invention is the adapter plate shear bolt 203, at both planes of contact between the two adapter plates 201 and the shank 151. That is to say, the relative thickness and cross section of the shank 151 is substantial enough that any of the two adapter plates 201, the fertilizer knife blank 212, the upper and lower tool mounting bolts 204 and 205, the adapter plate pivot bolt 202, and the adapter plate shear bolt 203 will fail upon contact of the tool assembly 200 with a hard object and failure of the shank assembly 150 to pivot up and over the hard object, before the shank 151 will fail. The relative thickness and cross section of the two adapter plates 201 is substantial enough that any of the fertilizer knife blank 212, the upper and lower tool mounting bolts 204 and 205, the adapter plate pivot bolt 202, and the adapter plate shear bolt 203 will fail before the two adapter plates 201 will fail. The relative thickness and cross section of the fertilizer knife blank 212 is substantial enough that any of the upper and lower tool mounting bolts 204 and 205, the adapter plate pivot bolt 202, and the adapter plate shear bolt 203 will fail before the fertilizer knife blank 212 will fail.

In this case, upon contact of the tool assembly 200 with a hard object and failure of the shank assembly 150 to pivot up and over the hard object, and upon shear of the adapter plate shear bolt 203, the tool assembly 200 then pivots up and rearwards about the uppermost matching mounting feature, the adapter plate pivot bolt 202. In order to ensure that the adapter plate shear bolt 203 shears before the adapter plate pivot bolt 202, the upper tool mounting bolt 204, or the lower tool mounting bolt 205, as well as to ensure that the adapter plate shear bolt 203 shears before any of the shank 151, the adapter plates 201, or the tool assembly 200 are damaged, the adapter plate shear bolt 203 may be of a reduced diameter as compared to the adapter plate pivot bolt 202 and/or the upper tool mounting bolt 204 and lower tool mounting bolt 205. Alternately, the adapter plate shear bolt 203 may be provided with other shear features, such as a frangible score line or neck, or metallurgical properties that promote shear of the adapter plate shear bolt 203 in a controlled manner.

By providing a shank assembly 150 and tool assembly 200 that are symmetric about a common centerline C/L as illustrated in FIG. 2C, and by providing two adapter plates 201 that are symmetric to one another, even in the case of contact of the tool assembly 200 with a hard object and shear of the adapter plate shear bolt 203 at the planes of contact between the adapter plates 201 and the shank 151, the tool assembly 200 is prevented from twisting about its connections with the two adapter plates 201 and/or about the connection between the two adapter plates 201 and the shank 151, so that any tendency of the tool assembly 200 to bend as a result of being dragged sideways is minimized. In other words, upon shear of the adapter plate shear bolt 203, the two adapter plates 201 and the tool assembly 200 simply pivots up and rearwards about the uppermost matching mounting feature, the adapter plate pivot bolt 202, while remaining in the plane of the arc of the shank 151. Even in an embodiment of the present invention wherein the shank assembly 150 is rigidly connected to the row unit mount assembly 110 without any shank springs 153 or shank pivot 152 to allow the shank assembly 150 to pivot up and rearward, and/or even in an embodiment of the present invention wherein no adapter plate shear bolt 203 or other designated shear member is provided, providing a shank assembly 150 and tool assembly 200 that are symmetric about a common centerline C/L, and providing two adapter plates 201 that are symmetric to one another attaching the tool assembly 200 to the shank assembly results in substantially increased support of the tool assembly 200 against impact loads and reduction of damage and failures due to side loads and cleavage forces.

Figure 3A:
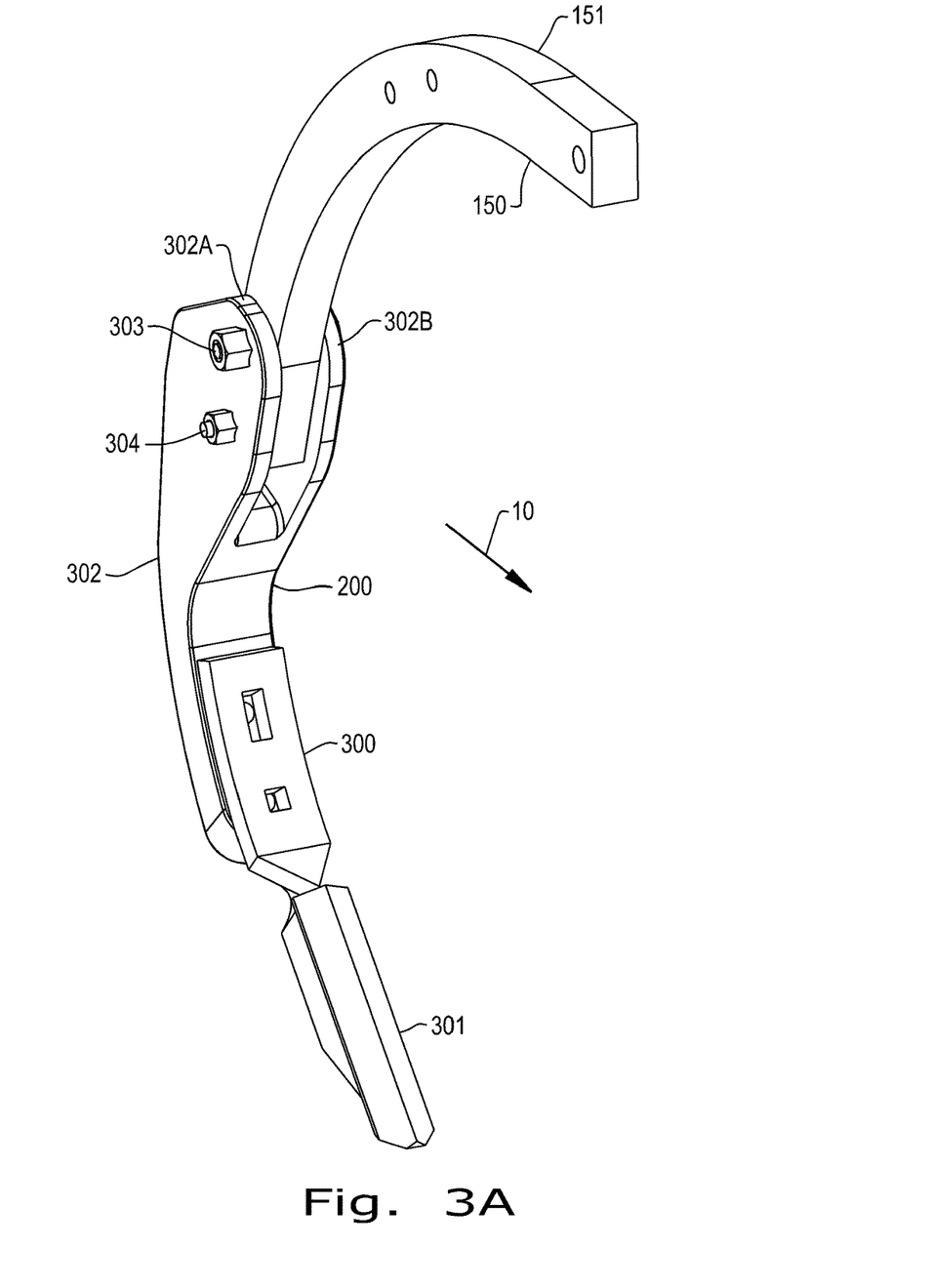
FIG. 3A is an isometric view of a shank and front mounted chisel assembly, in accordance with an exemplary embodiment of the present invention.
Figure 3B:
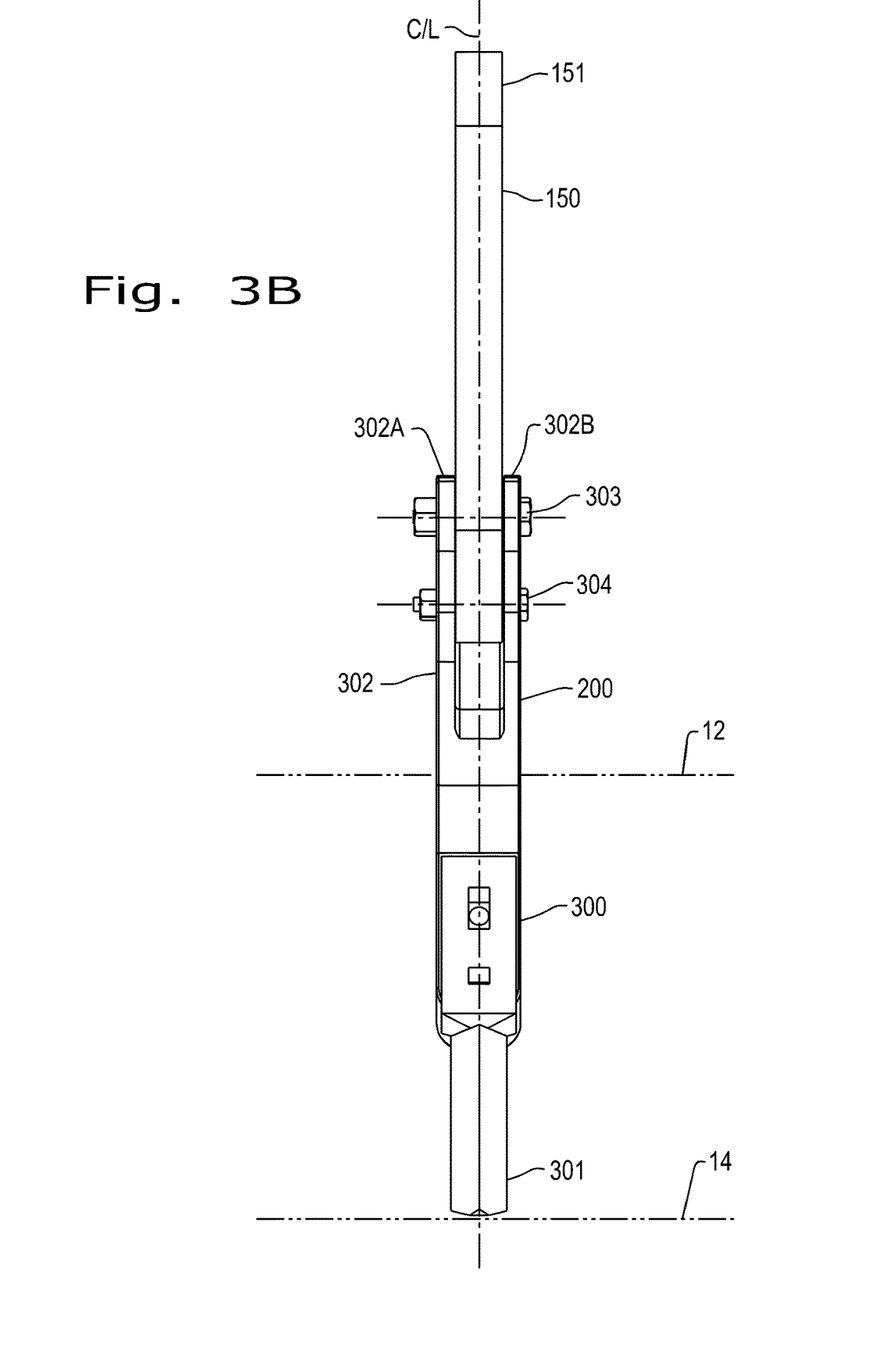
FIG. 3B is a front view of a shank and front mounted chisel assembly, in accordance with an exemplary embodiment of the present invention.

Turning now to FIGS. 3A and 3B, there is shown another embodiment of the present invention, a shank assembly 150 including a shank 151 and a tool assembly 200. The shank 151 again describes part of an arc, extending from an approximately horizontal alignment where it connects to the shank pivot 152 of the row unit mount assembly 110 (not shown) in the travel direction 10, to approximately 20° from vertical in the downward direction. At its downward end, the shank 151 is again provided with at least two mounting features, which may be holes. In lieu of the two adapter plates 201 of FIGS. 2A, 2B, and 2C, the tool assembly 200 shown in FIGS. 3A and 3B, which may be a front mounted chisel assembly 300, is provided with a single chisel point adapter 302 having matching mounting features on each of two chisel point adapter ears 302A and 302B, which matching mounting features may be holes. The chisel point adapter 302 and the chisel point adapter ears 302A and 302B may be cast, constructed as a weldment, or formed, as non-limiting examples. Chisel point adapter pivot bolt 303 is inserted through the upper holes of the single chisel point adapter ears 302A and 302B, and through the upper hole of the shank 151. Chisel point adapter shear bolt 304 is inserted through the lower holes of the single chisel point adapter ears 302A and 302B, and through the lower hole of the shank 151. The chisel point adapter pivot bolt 303 and the chisel point adapter shear bolt 304 may be in the form of bolts, as shown, or may be in the form of pins, as a non-limiting example. A chisel point 301 is then attached to the lower end of the chisel point adapter 302, so that the front mounted chisel assembly 300 extends downward from the surface line 12 approximately midway along the length of the chisel point adapter 302 to the depth line at the terminus of the chisel point 301.

Considering particularly FIG. 3B, it can be seen that the shank 151 and the tool assembly 200 again share a common centerline C/L from the uppermost end of the shank 151 to the lower end of the chisel point 301. By arranging the shank 151 and the chisel point adapter 302 and chisel point 301 of the front mounted chisel assembly 300 to have a common centerline in this way, and by configuring the chisel point adapter ears 302A and 302B to be symmetric about the shank 151, alignment of the front mounted chisel assembly 300 to the shank 151, and thereby to the travel direction 10 of the tillage implement, is greatly improved. Again, this is particularly advantageous when the tool assembly 200 is under the stress of being pulled through potentially hard packed soil.

As with the embodiment of the present invention shown in FIGS. 2A, 2B, and 2C, the relative thicknesses and cross sections of the shank 151 and the chisel point adapter ears 302A and 302B in the embodiment of the present invention shown in FIGS. 3A and 3B, along with the matching mounting features of shank 151 and the chisel point adapter ears 302A and 302B, may be chosen in such a way that, upon contact of the tool assembly 200 with a hard object and failure of the shank assembly 150 to pivot up and over the hard object, the most likely outcome is shear of the lower matching mounting feature, which in this embodiment of the present invention is the chisel point adapter shear bolt 304, at both planes of contact between the chisel point adapter ears 302A and 302B and the shank 151. That is to say, the relative thickness and cross section of the shank 151 is substantial enough that any of the chisel point adapter ears 302A and 302B, the chisel point adapter pivot bolt 303, and the chisel point adapter shear bolt 304 will fail upon contact of the tool assembly 200 with a hard object and failure of the shank assembly 150 to pivot up and over the hard object, before shank 151 will fail. The relative thickness and cross section of the chisel point adapter ears 302A and 302B is substantial enough that the chisel point adapter pivot bolt 303 or the chisel point adapter shear bolt 304 will fail before the chisel point adapter ears 302A and 302B will fail.

In this case, upon contact of the tool assembly 200 with a hard object and failure of the shank assembly 150 to pivot up and over the hard object, and upon shear of the chisel point adapter shear bolt 304, the tool assembly 200 then pivots up and rearwards about the uppermost matching mounting feature, the chisel point adapter pivot bolt 303. In order to ensure that the chisel point adapter shear bolt 304 shears before the chisel point adapter pivot bolt 303, as well as to ensure that the chisel point adapter shear bolt 304 shears before the shank 151 or the front mounted chisel assembly 300 is damaged, the chisel point adapter shear bolt 304 may again be of a reduced diameter as compared to the chisel point adapter pivot bolt 303. Alternately, the chisel point adapter shear bolt 304 may be provided with other shear features, such as a frangible score line or neck, or metallurgical properties that promote shear of the chisel point adapter shear bolt 304 in a controlled manner.

Again, by providing a shank 151 and front mounted chisel assembly 300 that are symmetric about a common centerline C/L as illustrated in FIG. 3B, including chisel point adapter ears 302A and 302B, even in case of contact of the front mounted chisel assembly 300 with a hard object and shear of the chisel point adapter shear bolt 304 at the planes of contact between the chisel point adapter ears 302A and 302B and the shank 151, the front mounted chisel assembly 300 is prevented from twisting about its connection with the shank 151, so that any tendency of the front mounted chisel assembly 300 to bend as a result of being dragged sideways is minimized. In other words, upon shear of the chisel point adapter shear bolt 304, the front mounted chisel assembly 300 simply pivots up and rearwards about the upper matching mounting feature, the chisel point adapter pivot bolt 303, while remaining in the plane of the arc of the shank 151. Clearance at the upper end of the chisel point adapter 302 between the chisel point adapter ears 302A and 302B is provided to facilitate the front mounted chisel assembly 300 pivoting up and rearwards in this way. Again, even in an embodiment of the present invention wherein the shank assembly 150 is rigidly connected to the row unit mount assembly 110 without any shank springs 153 or shank pivot 152 to allow the shank assembly 150 to pivot up and rearward, and/or even in an embodiment of the present invention wherein no chisel point adapter shear bolt 304 or other designated shear member is provided, providing a shank assembly 150 and tool assembly 200 that are symmetric about a common centerline C/L, and providing chisel point adapter ears 302A and 302B that are symmetric to one another attaching the chisel point adapter 302 of the tool assembly 200 to the shank assembly results in substantially increased support of the tool assembly 200 against impact loads and reduction of damage and failures due to side loads and cleavage forces.

Figure 4A:
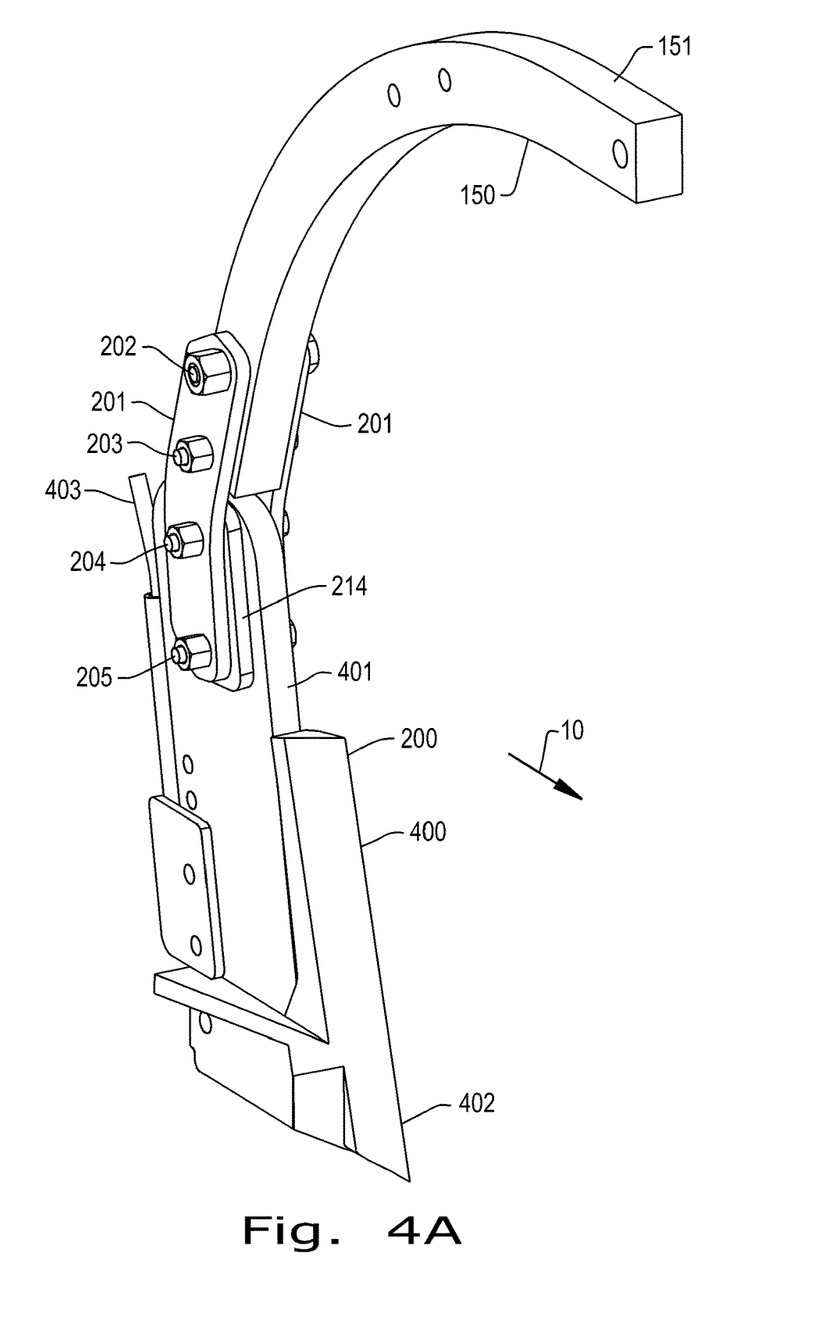
FIG. 4A is an isometric view of a shank and strip till knife assembly, in accordance with an exemplary embodiment of the present invention.
Figure 4B:
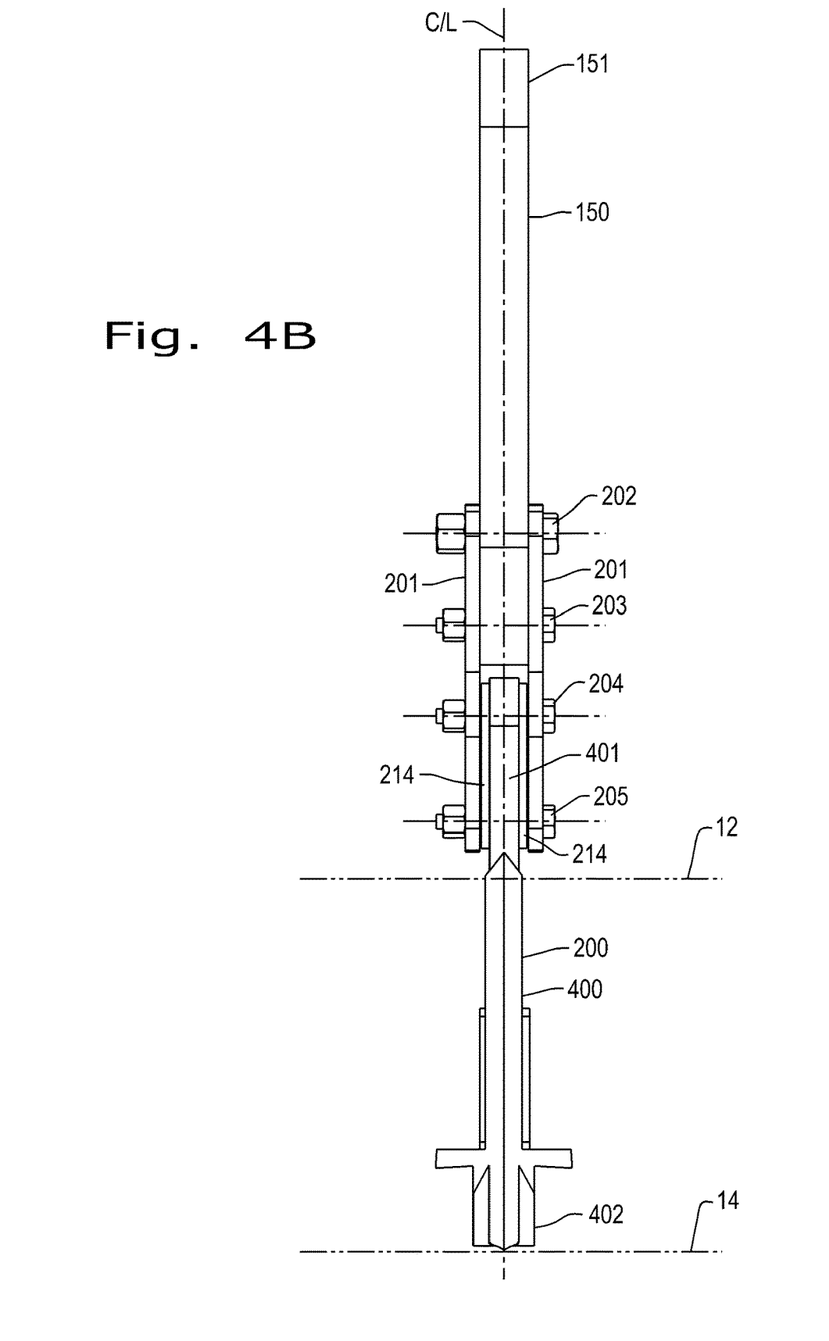
FIG. 4B is a front view of a shank and strip till knife assembly, in accordance with an exemplary embodiment of the present invention.

Turning now to FIGS. 4A and 4B, there is shown another embodiment of the present invention, a shank assembly 150 including a shank 151 and a tool assembly 200. The shank 151 again describes part of an arc, extending from an approximately horizontal alignment where it connects to the shank pivot 152 of the row unit mount assembly 110 (not shown) in the travel direction 10, to approximately 20° from vertical in the downward direction. At its downward end, the shank 151 is again provided with at least two mounting features, which may be holes. Two adapter plates 201 are again attached to the shank 151 by way of matching mounting features, which may be holes, through which an adapter plate pivot bolt 202 and an adapter plate shear bolt 203 may be inserted as shown. The adapter plate pivot bolt 202 and adapter plate shear bolt 203 may be in the form of bolts, as shown, or may be in the form of pins, as a non-limiting example. Alternately, the mounting features of the shank 151 may again be projecting cylindrical bosses, over which the holes in the two adapter plates are fitted, and with a cotter pin or similar device retained.

The tool assembly 200 in FIGS. 4A and 4B is again attached to the two adapter plates 201 by way of at least two further mounting features, which may again be holes and which match holes in the two adapter plates 201. An upper tool mounting bolt 204 and a lower tool mounting bolt 205 may inserted through the matching holes in the tool assembly 200 and in the two adapter plates 201. The upper tool mounting bolt 204 and lower tool mounting bolt 205 may again be in the form of bolts, as shown, or may be in the form of pins, as a non-limiting example. Further, the matching mounting features of the tool assembly 200 may alternately be projecting cylindrical bosses, over which projecting cylindrical bosses the holes in the two adapter plates 201 are fitted, and with a cotter pin or similar device retained.

In the case of the embodiment of the present invention in FIGS. 4A and 4B, the tool assembly 200 is a strip till knife assembly 400 having a ripstrip shank 401 with the matching mounting features to which the two adapter plates 201 are attached by way of the upper tool mounting bolt 204 and lower tool mounting bolt 205. The ripstrip shank 401 extends downwards from its attachment to the two adapter plates 201, approximately at the surface line 12, to a lower terminus having a strip till knife point 402, approximately at depth line 14. The strip till knife assembly 400 may be provided with a fertilizer tube 403, through which fertilizer is delivered to the area of the depth line 14 following passage of the strip till knife point 402.

Considering the front view of the present embodiment of the invention shown in FIG. 4B, the shank assembly 150 and the tool assembly 200 again share a common centerline C/L from the uppermost end of the shank 151 to the strip till knife point 402. Depending on the configuration of the tool assembly 200, spacers 214 may again be required between the adapter plates 201 and the tool assembly 200. These spacers 214 may again be welded to the ripstrip shank 401, or integrated therewith, or may be simply stacked next to the ripstrip shank 401. By arranging the shank 151 and the tool assembly 200 to have a common centerline from the uppermost end of the shank 151 to the strip till knife point 402, and by configuring the adapter plates 201 to be symmetric to one another, alignment of the tool assembly 200 to the shank 151, and thereby to the travel direction 10 of the tillage implement, is greatly improved, particularly when under the stress of being pulled through hard packed soil.

The relative thicknesses and cross sections of the ripstrip shank 401, the two adapter plates 201, and of the shank 151, along with the matching mounting features of the ripstrip shank 401, the two adapter plates 201, and of the shank 151, may again be chosen in such a way that, upon contact of the tool assembly 200 with a hard object and failure of the shank assembly 150 to pivot up and over the hard object, the most likely outcome is shear of the second uppermost matching mounting feature, which in this embodiment of the present invention is the adapter plate shear bolt 203, at both planes of contact between the two adapter plates 201 and the shank 151. As before, that is to say that the relative thickness and cross section of the shank 151 is substantial enough that any of the two adapter plates 201, the ripstrip shank 401, the upper and lower tool mounting bolts 204 and 205, the adapter plate pivot bolt 202, and the adapter plate shear bolt 203 will fail upon contact of the tool assembly 200 with a hard object and failure of the shank assembly 150 to pivot up and over the hard object, before the shank 151 will fail. The relative thickness and cross section of the two adapter plates 201 is substantial enough that any of the ripstrip shank 401, the upper and lower tool mounting bolts 204 and 205, the adapter plate pivot bolt 202, and the adapter plate shear bolt 203 will fail before the two adapter plates 201 will fail. The relative thickness and cross section of the ripstrip shank 401 is substantial enough that any of the upper and lower tool mounting bolts 204 and 205, the adapter plate pivot bolt 202, and the adapter plate shear bolt 203 will fail before the ripstrip shank 401 will fail.

Once again, upon contact of the tool assembly 200 with a hard object and failure of the shank assembly 150 to pivot up and over the hard object, and upon shear of the adapter plate shear bolt 203, the tool assembly 200 then pivots up and rearwards about the uppermost matching mounting feature, the adapter plate pivot bolt 202. In order to ensure that the adapter plate shear bolt 203 shears before the adapter plate pivot bolt 202, the upper tool mounting bolt 204, or the lower tool mounting bolt 205, as well as to ensure that the adapter plate shear bolt 203 shears before any of the shank 151, the adapter plates 201, or the tool assembly 200 are damaged, the adapter plate shear bolt 203 may be of a reduced diameter as compared to the adapter plate pivot bolt 202 and/or the upper tool mounting bolt 204 and lower tool mounting bolt 205. Alternately, the adapter plate shear bolt 203 may be provided with other shear features, such as a frangible score line or neck, or metallurgical properties that promote shear of the adapter plate shear bolt 203 in a controlled manner.

As with the embodiments of the present invention in FIGS. 2A, 2B, 2C, 3A, and 3B, by providing a shank assembly 150 and tool assembly 200 that are symmetric about a common centerline C/L as illustrated in FIG. 4B, and by providing two adapter plates 201 that are symmetric to one another, even in the case of contact of the tool assembly 200 with a hard object and shear of the adapter plate shear bolt 203 at the planes of contact between the adapter plates 201 and the shank 151, the tool assembly 200 is prevented from twisting about its connections with the two adapter plates 201 and/or about the connection between the two adapter plates 201 and the shank 151, so that any tendency of the tool assembly 200 to bend as a result of being dragged sideways is minimized. In other words, upon shear of the adapter plate shear bolt 203, the two adapter plates 201 and the tool assembly 200 simply pivots up and rearwards about the uppermost matching mounting feature, the adapter plate pivot bolt 202, while remaining in the plane of the arc of the shank 151. Again, even in an embodiment of the present invention wherein the shank assembly 150 is rigidly connected to the row unit mount assembly 110 without any shank springs 153 or shank pivot 152 to allow the shank assembly 150 to pivot up and rearward, and/or even in an embodiment of the present invention wherein no adapter plate shear bolt 203 or other designated shear member is provided, providing a shank assembly 150 and tool assembly 200 that are symmetric about a common centerline C/L, and providing two adapter plates 201 that are symmetric to one another attaching the tool assembly 200 to the shank assembly results in substantially increased support of the tool assembly 200 against impact loads and reduction of damage and failures due to side loads and cleavage forces.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tillage implement, comprising:
    at least one row unit;
    at least one shank assembly including a shank engaged at one end thereof with the at least one row unit, an opposing end of the shank extending a distance downward, and a tool connected at a connecting end thereof to the shank by way of a planar member positioned on a portion of each lateral side of the shank and a portion of each lateral side of the tool and over each lateral side of a junction of the opposing end of the shank and the connecting end of the tool, a free end of the tool extending a distance downward to engage the ground;
    the shank having at least two mounting features, and the tool having at least one mounting feature;
    each planar member having at least two matching mounting features for the shank, and at least one matching mounting feature for the tool;
    a first connecting member engaged with one of the at least two mounting features of the shank and with one of the at least two matching mounting features of each planar member, the first connecting member comprising a pivot member;
    a second connecting member engaged with one of the at least two mounting features of the shank and with one of the at least two matching mounting features of each planar member, the second connecting member comprising a shear member; and
    at least one additional connecting member engaged with the at least one mounting feature of the tool and with the at least one matching mounting feature of each planar member.

2. The tillage implement of claim 1, wherein:
    the at least one shank assembly is arranged on a common vertical centerline when the tool is connected to the shank by way of the planar members;
    wherein the planar members on each lateral side of the shank are positioned symmetrically opposite of one another about the common vertical centerline; and
    wherein the first connecting member is positioned above the second connecting member.

3. The tillage implement of claim 2, wherein:
    the shank assembly is pivotally engaged with the at least one row unit; and
    the shank assembly is biased toward engagement with the ground via at least one spring member carried by the row unit, and
    wherein when the tool of the at least one shank assembly encounters an object in the ground in which the spring of the row unit is inadequate to permit the at least one shank assembly to deflect therefrom, the shear member shears and the pivot member permits the tool to pivot to preserve the tool.

4. The tillage implement of claim 2, wherein:
    planar members on each lateral side of the shank each further comprises a separate adapter plate.

5. The tillage implement of claim 1, wherein:
    the at least two mounting features of the shank and the at least two mounting features of each planar member further comprise holes;
    the pivot member further comprises a bolt or pin; and
    the at least one shear member further comprises a bolt or a pin.

6. The tillage implement of claim 5, wherein:
    said pivot member is inserted through an upper of said at least two mounting feature holes in said shank and through an upper of said at least two mounting feature holes in each said planar member; and
    said at least one shear member is inserted through a lower of said at least two mounting feature holes in said shank and through a lower of said at least two mounting feature holes in each said planar member.

7. The tillage implement of claim 5, wherein:
said at least one shear member is further provided with at least one shear ensuring feature.

8. The tillage implement of claim 1, wherein:
the shank of the at least one shank assembly further comprises a flat-sided curved shank having no lateral offset.

9. A ground working member of a tillage implement, comprising:
a shank assembly including a shank engaged at one end thereof with the tillage implement, an opposing end of the shank extending a distance downward, and a tool connected at a connecting end thereof to the shank by way of a planar member positioned on a portion of each lateral side of the shank and a portion of each lateral side of the tool and over each lateral side of a junction of the opposing end of the shank and the connecting end of the tool, a free end of the tool extending a distance downward to engage the ground;
the shank having at least two mounting features, and the tool having a least one mounting feature;
each planar member having at least two matching mounting features for the shank, and at least one matching mounting feature for the tool;
a first connecting member engaged with one of the at least two mounting features of the shank and with one of the at least two matching mounting features of each planar member, the first connecting member comprising a pivot member;
a second connecting member engaged with one of the at least two mounting features of the shank and with one of the at least two matching mounting features of each planar member, the second connecting member comprising a shear member; and
at least one additional connecting member engaged with the at least one mounting feature of the tool and with the at least one matching mounting feature of each planar member.

10. The ground working member of claim 9, wherein:
the shank assembly is arranged on a common vertical centerline when the tool is connected to the shank by way of the planar members;
wherein the planar members on each lateral side of the shank are positioned symmetrically opposite of one another about the common vertical centerline; and
wherein the first connecting member is positioned above the second connecting member.

11. The ground working member of claim 10, wherein:
the planar members on each lateral side of the shank each further comprises a separate adapter plate.

12. The ground working member of claim 9, wherein:
the shank of the shank assembly further comprises a flat-sided curved shank having no lateral offset.

* * * * *